(12) United States Patent
Broker, III

(10) Patent No.: US 9,397,489 B2
(45) Date of Patent: Jul. 19, 2016

(54) BATHROOM BUTLER SYSTEM

(71) Applicant: Michael John Broker, III, Lohman, MO (US)

(72) Inventor: Michael John Broker, III, Lohman, MO (US)

(*) Notice: Subject to any disclaimer, the term of this patent is extended or adjusted under 35 U.S.C. 154(b) by 48 days.

(21) Appl. No.: 14/326,104

(22) Filed: Jul. 8, 2014

(65) Prior Publication Data

US 2016/0007811 A1 Jan. 14, 2016

(51) Int. Cl.
*H02G 3/08* (2006.01)
*A45D 20/00* (2006.01)
*H02G 3/10* (2006.01)
*H02G 3/18* (2006.01)
*H02G 11/02* (2006.01)

(52) U.S. Cl.
CPC .................. *H02G 3/08* (2013.01); *A45D 20/00* (2013.01); *H02G 3/10* (2013.01); *H02G 3/18* (2013.01); *H02G 11/02* (2013.01)

(58) Field of Classification Search
CPC ............................... H02G 11/00; H02G 11/02
USPC ...... 191/12 R, 12.2 R, 12.2 A, 12.4; 206/701, 206/702
See application file for complete search history.

(56) References Cited

U.S. PATENT DOCUMENTS 6,591,952 B1 * 7/2003 Randall .................. A45D 44/02
191/12.4

* cited by examiner

*Primary Examiner* — R. J. McCarry, Jr.

(57) ABSTRACT

A housing has a front panel, a rear panel, a top panel, a bottom panel, and side panels. Openings are formed in the front panel. A plurality of chambers are in the housing. Each chamber is in communication with an associated opening. Each of a plurality of divider plates has a support surface within an associated chamber. A spool is rotatably supported in each chamber. Each spool has an electrical outlet rotatable with the spool. A drive assembly includes a motor within each chamber. Each motor is coupled to an associated spool. In this manner the spool is rotated.

2 Claims, 5 Drawing Sheets

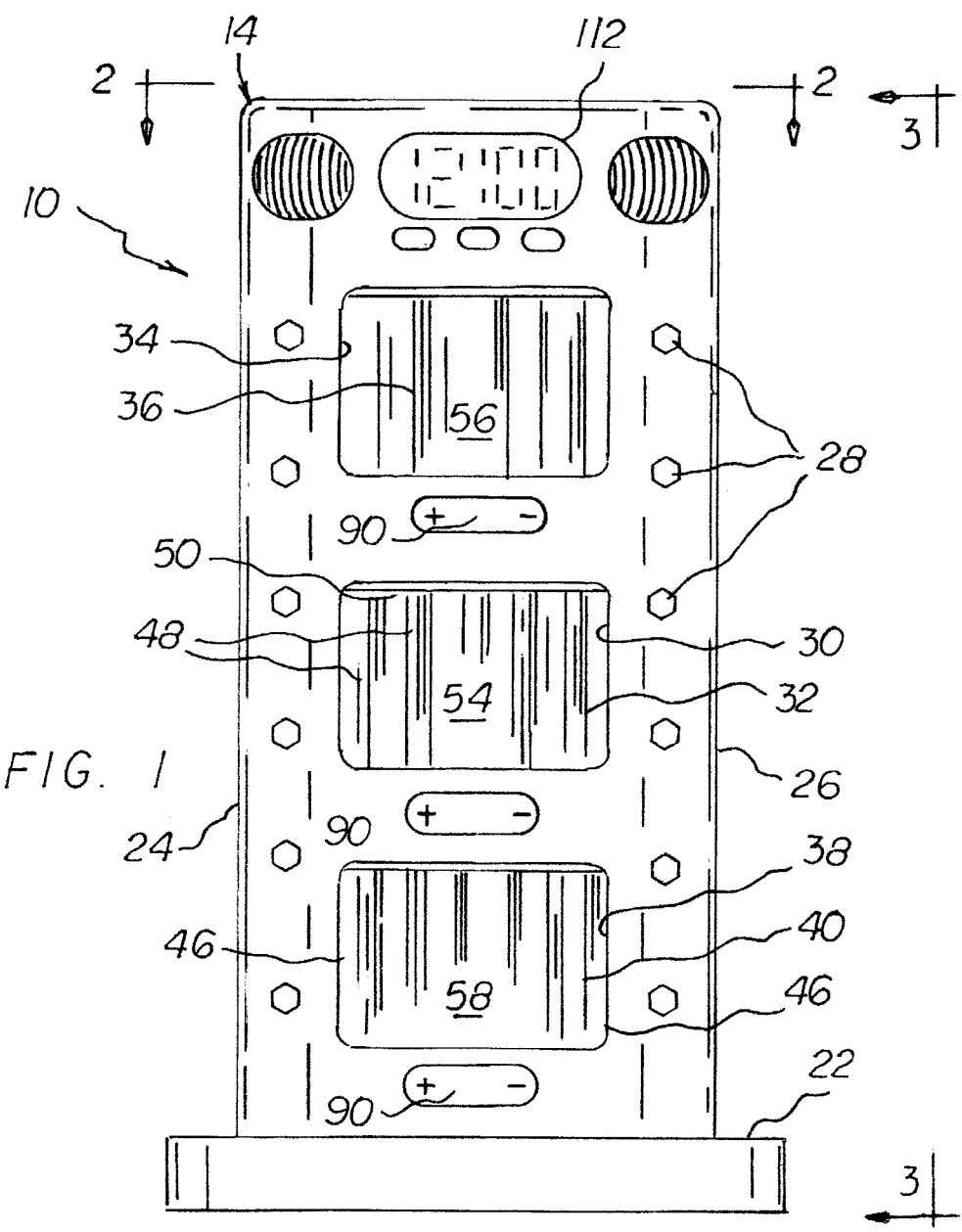
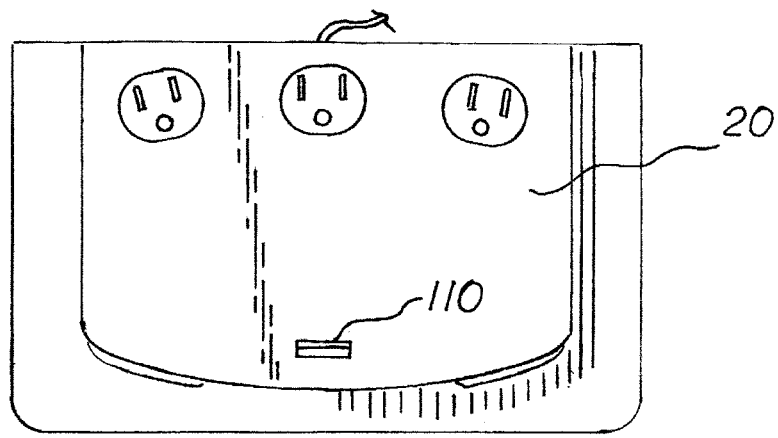

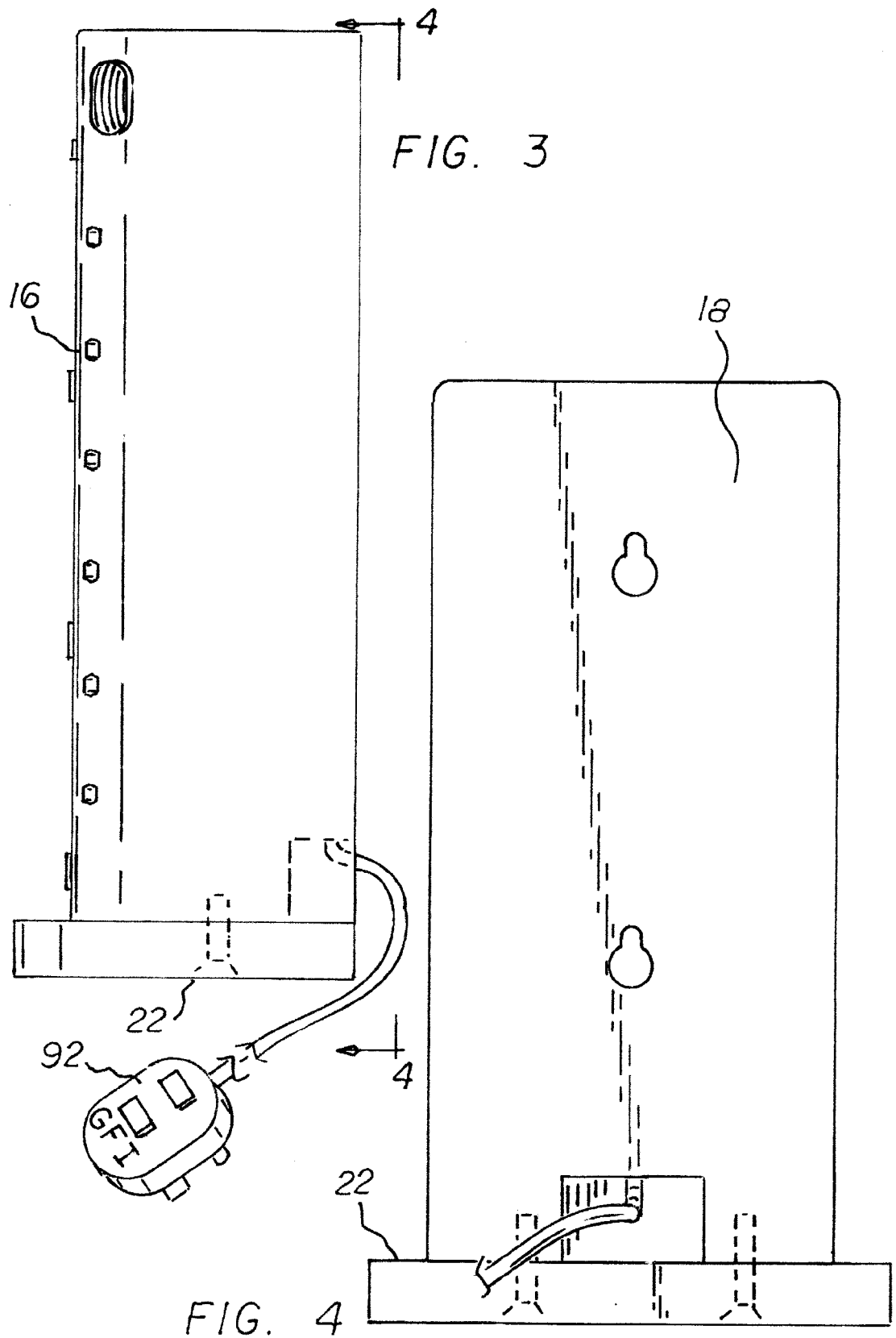

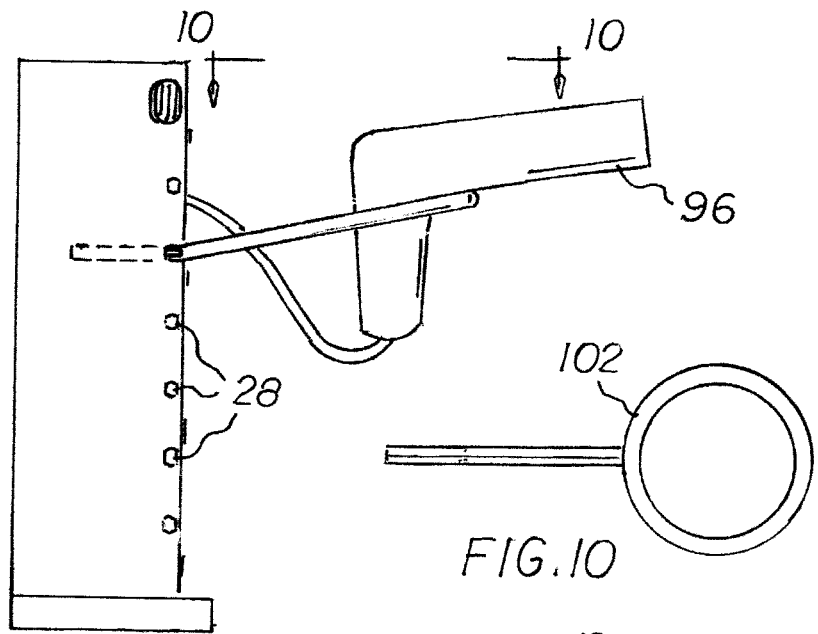
FIG. 9
FIG. 10
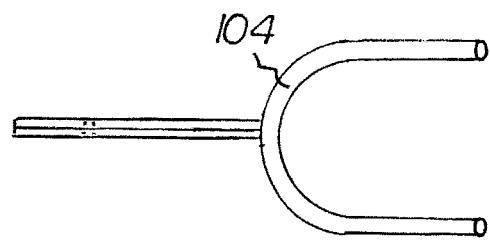
FIG. 11
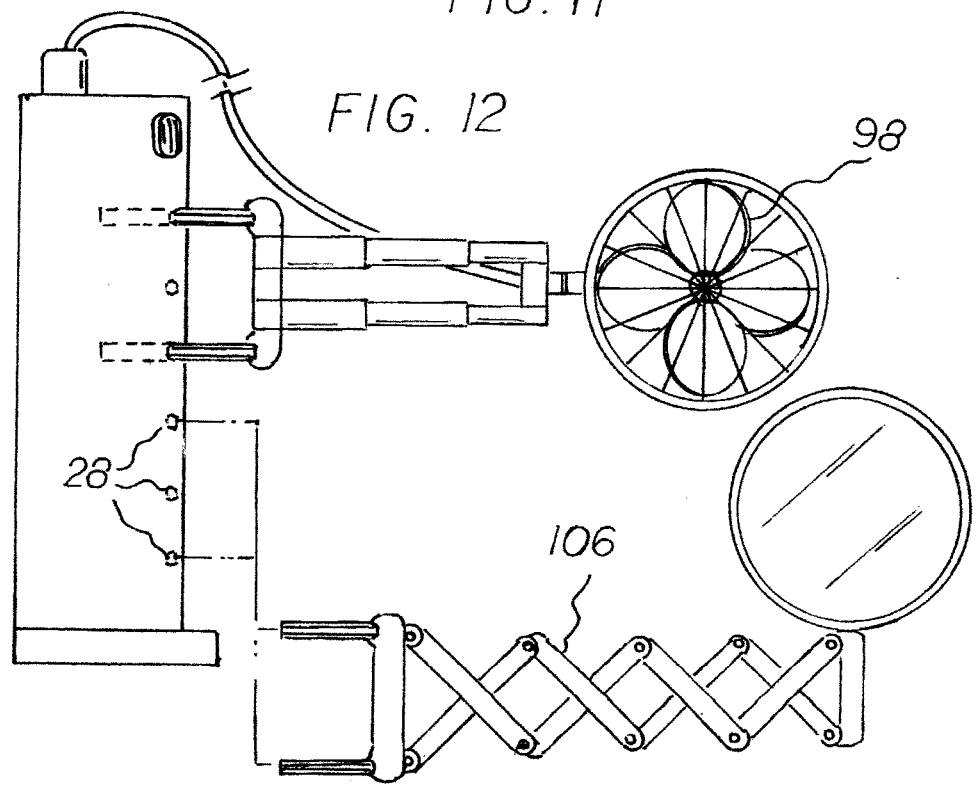
FIG. 12

BATHROOM BUTLER SYSTEM

BACKGROUND OF THE INVENTION

Field of the Invention

The present invention relates to a bathroom butler system and more particularly pertains to removably supporting bathroom related devices, for electrical powering supported devices, and for abating tangling of electrical cords of electrical powered devices, the supporting and powering and abating being done in a safe, convenient and economical manner.

SUMMARY OF THE INVENTION

In view of the foregoing disadvantages inherent in the known types of bathroom related systems of known designs and configurations now present in the prior art, the present invention provides an improved bathroom butler system. As such, the general purpose of the present invention, which will be described subsequently in greater detail, is to provide a new and improved bathroom butler system and method which has all the advantages of the prior art and none of the disadvantages.

To attain this, from a broad standpoint, the present invention essentially comprises a housing. The housing has a front panel, a rear panel, a top panel, a bottom panel, and side panels. A plurality of openings is formed in the front panel. A plurality of chambers are provided in the housing. Each chamber is in communication with an associated opening. A plurality of divider plates is provided. Each divider plate has a support surface. The support surfaces are provided within an associated chamber. A spool is rotatably supported in each chamber. Each spool has an electrical outlet rotatable with the spool. A drive assembly is provided. The drive assembly includes a motor. A motor is provided within each chamber. A motor is coupled to an associated spool. In this manner the spool is rotated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bathroom butler system which has all of the advantages of the prior art bathroom systems of known designs and configurations and none of the disadvantages.

It is another object of the present invention to provide a new and improved bathroom butler system which may be easily and efficiently manufactured and marketed.

It is a further object of the present invention to provide a new and improved bathroom butler system which is of durable and reliable constructions.

An even further object of the present invention is to provide a new and improved bathroom butler system which is susceptible of a low cost of manufacture with regard to both materials and labor, and which accordingly is then susceptible of low prices of sale to the consuming public, thereby making such bathroom butler system economically available to the buying public.

Lastly, another object of the present invention is to provide a bathroom butler system for removably supporting bathroom related devices, for electrical powering supported devices, and for abating tangling of electrical cords of electrical powered devices, the supporting and powering and abating being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a bathroom butler system constructed in accordance with the principles of the present invention.

FIG. 2 is a plan view taken along line 2-2 of FIG. 1.

FIG. 3 is a side elevational view taken along line 3-3 of FIG. 1.

FIG. 4 is a rear elevational view taken along line 4-4 of FIG. 3.

FIG. 9 is a side elevational view similar to FIG. 3 but with an electrical device, a hair drier, removably coupled with respect thereto.

FIGS. 10 and 11 are plan views taken along line 10-10 of FIG. 9 showing alternate supporting components.

FIG. 12 is a side elevational view similar to FIG. 9 but with an alternate electrical device, a fan, and a non-electrical device, a mirror, removably coupled with respect thereto.

The same reference numerals refer to the same parts throughout the various Figures.

DESCRIPTION OF THE PREFERRED EMBODIMENT

Figure 5:
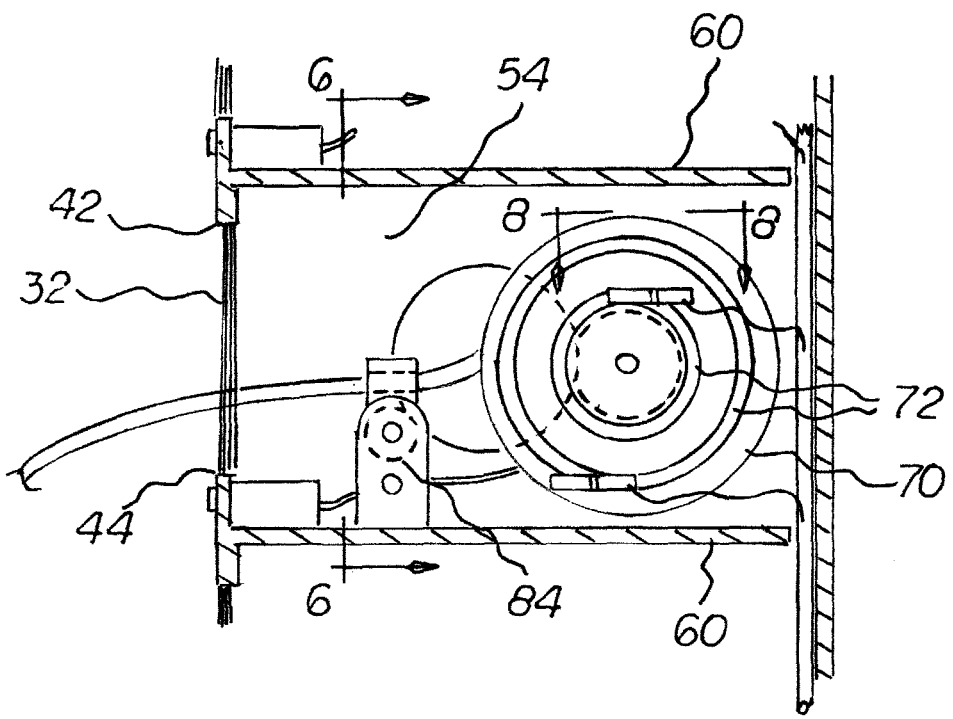
FIG. 5 is a cross sectional of one of the storage zones of the prior Figures.
Figure 6:
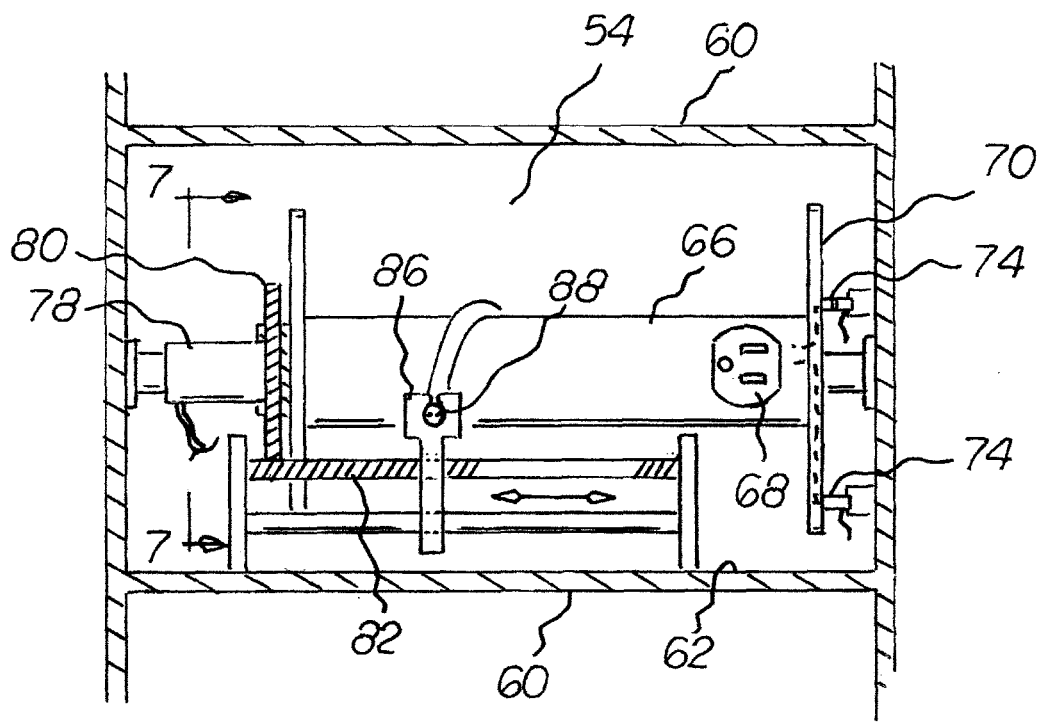
FIG. 6 is a cross sectional view taken along line 6-6 of FIG. 5.
Figure 7:
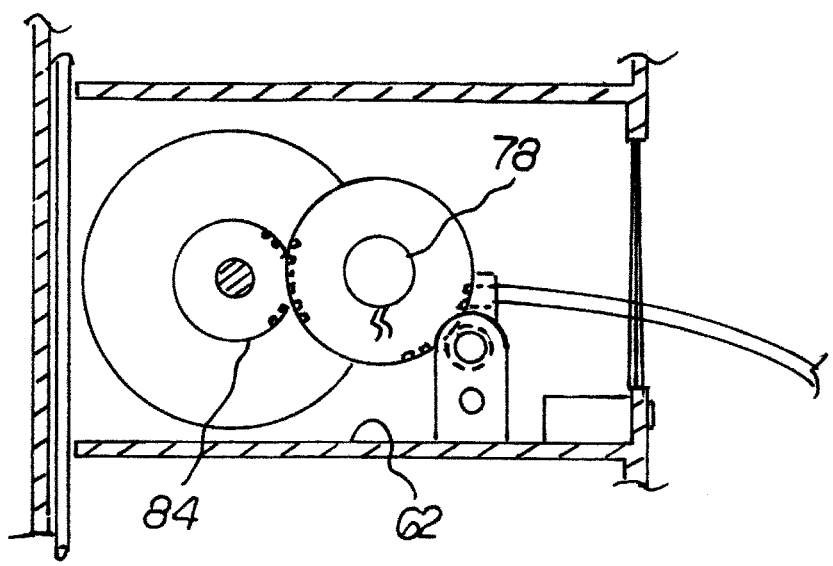
FIG. 7 is a cross sectional view taken along line 7-7 of FIG. 6.
Figure 8:
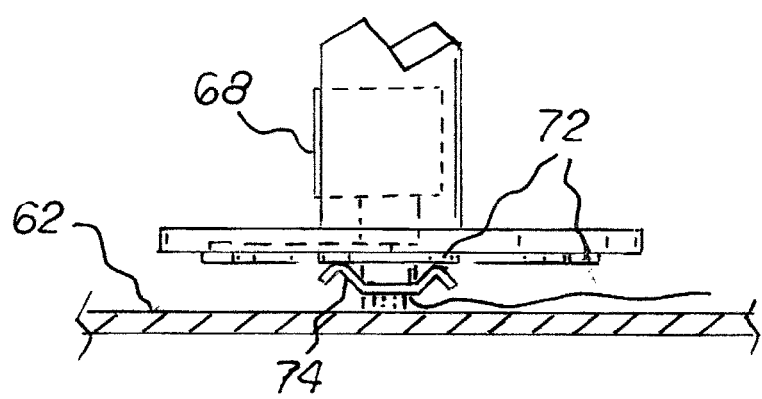
FIG. 8 is a cross sectional view taken along line 8-8 of FIG. 5.

With reference now to the drawings, and in particular to FIG. 1 thereof, the preferred embodiment of the new and improved bathroom butler system embodying the principles and concepts of the present invention and generally designated by the reference numeral 10 will be described.

The present invention, the bathroom butler system 10 is comprised of a plurality of components. Such components in their broadest context include a housing, a spool, and a drive assembly. Such components are individually configured and correlated with respect to each other so as to attain the desired objective.

From a specific standpoint, first provided is a housing 14. The housing is formed in a generally rectilinear configuration. The housing has a curved front panel 16. The housing has an opposed rectangular rear panel 18. The housing is separated by a depth at a mid-plane. The housing has a rectangular top panel 20. The housing has a parallel rectangular bottom panel 22. The top panel and bottom panel are separated by a height. The housing has parallel rectangular first and second side panels 24, 26. The first and second side panels are separated by a width. The bottom panel is larger than the top panel. The width is greater than the depth. The height is between 2 and 3 timed the depth. The front panel has a plurality of support holes 28. The support holes are vertically aligned. The bottom panel is adapted to be removed. In this manner the housing may be mounted on a wall. It is preferred that the system includes a heavy bottom plate as a base designed to hold the system including the electrical devices on a counter top.

A central opening 30 is provided. The central opening is formed in a central extent of the front panel. A central curtain 32 is provided. The central curtain covers the central opening. An upper opening 34 is provided. The upper opening is formed in an upper extent of the front panel. An upper curtain 36 is provided. The upper curtain covers the upper opening. A lower opening 38 is provided. The lower opening is formed in a lower extent of the housing. A lower curtain 40 is provided. The lower curtain covers the lower opening. The openings are vertically aligned. Each opening has a rectangular configuration. Each opening has an upper edge 42. Each opening has a lower edge 44. Each opening also has side edges 46. The openings are all of a same size. The openings are all adapted to permit passage of a hand of a user. The curtains are formed of flexible strands 48. The flexible strands have upper ends 50. The upper ends are attached to the upper edge of each opening;

A central chamber 54 is provided. The central chamber is provided within the housing. The central chamber is in communication with the central opening. An upper chamber 56 is provided. The upper chamber is provided within the housing. The upper chamber is in communication with the upper opening. A lower chamber 58 is provided. The lower chamber is provided within the housing. The lower chamber is provided in communication with the lower opening. A plurality of divider plates 60 is provided. The divider plates are located within the housing. The divider plates bound the chambers above and below. The divider plates include a lower plate. The lower plate has a support surface 62 for each chamber.

Provided next is a plurality of spools 66. Each spool is rotatably supported in an associated chamber by the side walls. Each spool has an electrical outlet 68. The electrical outlet is rotatable with the spool. Each spool has an end cap 70. Each end cap is has rotatable annular conductive rings 72. Each end cap has fixed electrical fingers 74. In this manner electrical energy is supplied from a source, through the rings and fingers and outlet, to an electrical devices. A plurality of electrical outlets 76 are provided. The electrical outlets are positioned on the top panel of the housing.

A drive assembly is provided next. The drive assembly includes a motor 78. A motor is provided within each chamber. The motor is coupled to the spool. In this manner the spool is rotated. The drive assembly includes a primary gear 80. The primary gear is attached to each spool remote from the rings and fingers for rotation with the spool. An axial guide is provided. The axial guide has a fixed spiral gear 82. The axial guide also has a secondary gear 84. The secondary gear couples the primary gear and the spiral gear. The drive assembly includes a guide follower 86. The guide follower is coupled to the spiral gear. The guide follower is adapted to reciprocate parallel with the spool in response to rotation of the primary and secondary gears. The guide follower has an aperture 88. In this manner an electrical cord of an electrical device is received. Also in this manner the motor is powered. Further in this manner the motor will distribute the electrical cord onto the spool along the spool.

Controls are provided. The controls include a control button 90. A control button is provided for each motor for rotating the spool in a plus spooling direction and a minus unspooling direction. The controls also include a ground fault interrupter plug 92. In this manner the system is powered.

Also usable with the present invention are a plurality of electrical devices. Such electrical devices include hair dryers 96, curlers, and the like. Such hair dryers, curlers, and the like are normally provided by the user. Such electrical devices have cords. The cords are adapted to be wound around the spool. Other devices such as the mirror and the fan 98 are, preferably included with the system.

Further provided is a plurality of attachment components. The attachment components include exterior hoops 102, forks 104, extenders 108, and the like. The attachment components are releasably coupled to the support apertures in the housing. In this manner the electrical devices are supported.

Provided last are additional components. The additional components include a USB port 110. The USB port is provided in the top panel. Such USB port has various functions such as for charging phones, music devices, and related devices. Such USB port is also adapted to be coupled to speakers so that users may play their music through such speakers. The additional components also includes a clock/radio 112. The clock/radio has laterally spaced speakers and control buttons.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bathroom butler system comprising:
   a housing having a front panel and a rear panel separated by a depth, a top panel and a bottom panel separated by a height, and side panels separated by a width, the height being between 2 and 3 times the depth;

a plurality of elevationally spaced openings formed in the front panel;

a plurality of chambers in the housing, each chamber in communication with an associated opening, a plurality of divider plates, each divider plate having a support surface within an associated chamber;

a spool rotatably supported in each chamber, each spool having an electrical outlet rotatable with the spool; and a drive assembly including a motor within each chamber coupled to an associated spool for rotating the spool;

each opening having an upper edge, curtains formed of flexible material with upper ends attached to, and depending from, each opening at the upper edge;

each spool having an end cap with rotatable annular conductive rings and further including fixed electrical fingers for supplying electrical energy from a source, through the fingers and the rings and the electrical outlet to an electrical devices;

the drive assembly further including a primary gear attached to each spool for rotation with the spool, an axial guide with a fixed spiral gear, a secondary gear coupling the primary gear and the spiral gear, a guide follower coupled to the spiral gear adapted to reciprocate parallel with the spool in response to rotation of the primary gear and the secondary gear, an aperture in the guide follower for the receipt of an electrical cord of an electrical device whereby powering of the motor will distribute an electrical cord onto the spool along the spool.

2. A bathroom butler system (10) for removably supporting bathroom related devices, for electrical powering supported devices, and for abating tangling of electrical cords of electrical powered devices, the supporting and powering and abating being done in a safe, convenient aan economical manner, the system comprising, in combination:

a housing (14) formed in a generally rectilinear configuration, the housing having a curved front panel (16) and an opposed rectangular rear panel (18) separated by a depth at a mid-plane, the housing having a rectangular top panel (20) and a parallel rectangular bottom panel (22) separated by a height, the housing having parallel rectangular first and second side panels (24), (26) separated by a width, the bottom panel being larger than the top panel, the width being greater than the depth, the height being between 2 and 3 timed the depth, a plurality of support holes (28) vertically aligned in the front panel, the bottom panel adapted to be removed so as to allow the housing to be mounted on a wall;

a central opening (30) formed in a central extent of the front panel, a central curtain (32) covering the central opening, an upper opening (34) formed in an upper extent of the front panel, an upper curtain (36) covering the upper opening, a lower opening (38) formed in a lower extent of the housing, a lower curtain (40) covering the lower opening, the openings being vertically aligned, each opening having a rectangular configuration with an upper edge (42) and a lower edge (44) and side edges (46), the openings all being of a same size and adapted to permit passage of a hand of a user, the curtains being formed of flexible strands (48) with upper ends (50) attached to the upper edge of each opening;

a central chamber (54) within the housing in communication with the central opening, an upper chamber (56) within the housing in communication with the upper opening, a lower chamber (58) within the housing in communication with the lower opening, a plurality of divider plates (60), the divider plates located within the housing and bounding the chambers above and below, the divider plates including a lower plate with a support surface (62) for each chamber;

a plurality of spools (66), each spool rotatably supported in an associated chamber by the side walls, each spool having an electrical outlet (68) rotatable with the spool, each spool having an end cap (70) with rotatable annular conductive rings (72) and fixed electrical fingers (74) for supplying electrical energy from a source, through the rings and fingers and outlet, to an electrical devices, a plurality of electrical outlets (76) positioned on the top panel of the housing;

a drive assembly including a motor (78) within each chamber coupled to the spool for rotating the spool, a primary gear (80) attached to each spool remote from the rings and fingers for rotation with the spool, an axial guide with a fixed spiral gear (82), a secondary gear (84) coupling the primary gear and the spiral gear, a guide follower (86) coupled to the spiral gear adapted to reciprocate parallel with the spool in response to rotation of the primary and secondary gears, an aperture (88) in the guide follower for the receipt of an electrical cord of an electrical device whereby powering of the motor will distribute an electrical cord onto the spool along the spool;

controls including a control button (90) for each motor for rotating the spool in a plus spooling direction and a minus unspooling direction, the controls also including a ground fault interrupter plug (92) for powering the system;

a plurality of electrical devices including hair dryers (96), fans (98), and curlers, the electrical devices having cords adapted to be wound around the spool;

a plurality of attachment components including exterior hoops (102), forks (104), and extenders (100), the attachment components being releasably coupled to the support apertures in the housing for supporting the electrical devices; and additional components including a USB port (110) in the top panel and a clock/radio (112) with laterally spaced speakers and control buttons.

* * * * *